(12) United States Patent
Aler et al.

(10) Patent No.: US 6,348,790 B1
(45) Date of Patent: Feb. 19, 2002

(54) MOTOR ROTATION DETECTOR APPARATUS

(75) Inventors: Mark D. Aler, Skokie; Jin H. Gu, Wheeling, both of IL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/274,488

(22) Filed: Mar. 23, 1999

(51) Int. Cl.[7] .................................................. G01B 7/30
(52) U.S. Cl. ............................ 324/207.25; 324/207.15; 324/165
(58) Field of Search .................... 324/207.15, 207.25, 324/207.26, 167, 165; 340/672

(56) References Cited

U.S. PATENT DOCUMENTS 3,943,504 A * 3/1976 Vosicky ..................... 340/271
4,001,689 A * 1/1977 Williams et al. .......... 324/34 D

* cited by examiner

*Primary Examiner*—Hezron Williams
*Assistant Examiner*—Henry S. Andersen
(74) *Attorney, Agent, or Firm*—Menotti J. Lombardi (57) ABSTRACT

A leadless motor rotation detector apparatus for determining the direction of shaft rotation of a motor providing a fluctuating magnetic field when rotating includes: at least two sensors separated a predetermined distance from one another. Each sensor senses the magnetic field and generates a corresponding sensor signal having an amplitude and phase associated with said sensed magnetic field. A processor is responsive to the sensor signals, and compares temporal aspects associated with the relative phase of each of the sensor signals to determine a leading or lagging signal. The leading or lagging signal is associated with a corresponding one of the at least two sensors and is indicative of the direction of motor rotation.

11 Claims, 10 Drawing Sheets

MOTOR ROTATION DETECTOR APPARATUS

FIELD OF THE INVENTION

The present invention relates to magnetic rotation sensors and in particular, to a non-intrusive motor rotation detector for determining the direction of shaft rotation of an electrical alternating current induction motor without requiring physical contact with the motor.

BACKGROUND OF THE INVENTION

Knowledge of the proper direction of motor shaft rotation is essential when integrating today's industrial motors within systems and machines designed to perform particular applications and tasks. Previously, one could view the direction of motor shaft rotation because few motors possessed hidden shafts or shafts covered by a safety guard. However, as time progressed, regulatory requirements, specific applications, and economic considerations required many motor shafts to become hidden in housings, covered with safety guards, or made an integral part of a mechanical assembly. This inhibited visible determination of the direction of motor shaft rotation. Although rotation direction could still be determined by viewing the motor prior to assembly within the machine or by viewing the process results, these methods often proved inadequate for a number of reasons. First, costly equipment may be damaged by reverse operation for any period above a short time interval; viewing the results of a process that takes even a relatively small amount of time to complete may result in irreparable damage to the machine. Moreover, reverse operation of shaft rotation may not be obvious from viewing the results and may inadvertently be accepted as normal. In addition, original equipment vendors may have a need to check rotation of hidden shaft units so that the final manufacturer can install the motor without the cost of re-connecting motors to obtain the proper shaft rotation.

A number of detectors exist in the prior art for determining shaft rotation direction. However, these instruments require electrical connections to the motor. This imposes added cost, time and labor in order to stop the motor, connect the rotation detector, start the motor, determine the rotation, and disconnect the detector, before moving on to the next unit under test.

Consequently, a compact means for providing an indication of the direction of rotation of a motor shaft without incurring the labor and time investment associated with connecting and disconnecting electrical leads and stopping and starting the motor is greatly desired.

SUMMARY OF THE INVENTION

It is an object of the invention to provide an improved rotation detection sensor for determining the direction of shaft rotations of an electric motor.

Another object of the invention is to provide an improved motor rotation detector that does not require electrical leads connected to the motor or any physical contact with the motor.

Another object of the invention is to provide a leadless motor rotation detector apparatus for determining the direction of shaft rotation of a motor, the motor of the type providing a fluctuating magnetic field when rotating, the apparatus having at least two sensors separated a predetermined distance D1 from one another, each sensor operable for sensing the magnetic field and generating a corresponding signal having an amplitude and phase associated with the sensed magnetic field; and a processor responsive to the signals for comparing temporal aspects associated with the relative phase of each of the signals to determine a leading signal, the leading signal associated with a corresponding one of the at least two sensors and is indicative of the direction of motor rotation.

A further object of the invention is to provide a small, compact, handheld moisture resistant rotation detection apparatus which senses the phase difference between two signals induced by a fluctuating magnetic field from the rotation of an electric motor shaft and operates on the relative signal phase difference to indicate the direction of the rotation of the motor shaft.

There is provided a compact portable motor rotation detector apparatus for determining the direction of shaft rotation of a motor, the motor of the type providing a fluctuating magnetic field when rotating, the apparatus comprising first and second sensors displaced a predetermined distance D1 from one another for detecting the fluctuating magnetic field and producing corresponding first and second sensor signal waveforms, each having an amplitude and phase corresponding to the sensed fluctuating magnetic field from each of the corresponding first and second sensors; amplifier circuitry for amplifying the respective first and second sensor signal waveforms; a processor having first and second input channels for receiving the corresponding amplified first and second sensor signal waveforms, wherein the processor includes an algorithm for determining the phase angle between the two signal waveforms to determine the time shift between the first and second signal waveforms for determining a leading signal associated with a corresponding one of the first and second sensors; and output means for providing a control signal indicative of the direction of motor rotation based on the determination of which sensor is associated with the leading signal.

Further objects of this invention, as well as the novel features thereof, will become apparent by reference to the following description, taken in conjunction with the accompanying figures.

BRIEF DESCRIPTION OF THE DRAWINGS

A complete understanding of the present invention may be gained by considering the following detailed description in conjunction with the accompanying drawings in which.

DETAILED DESCRIPTION OF THE INVENTION

Figure 1:
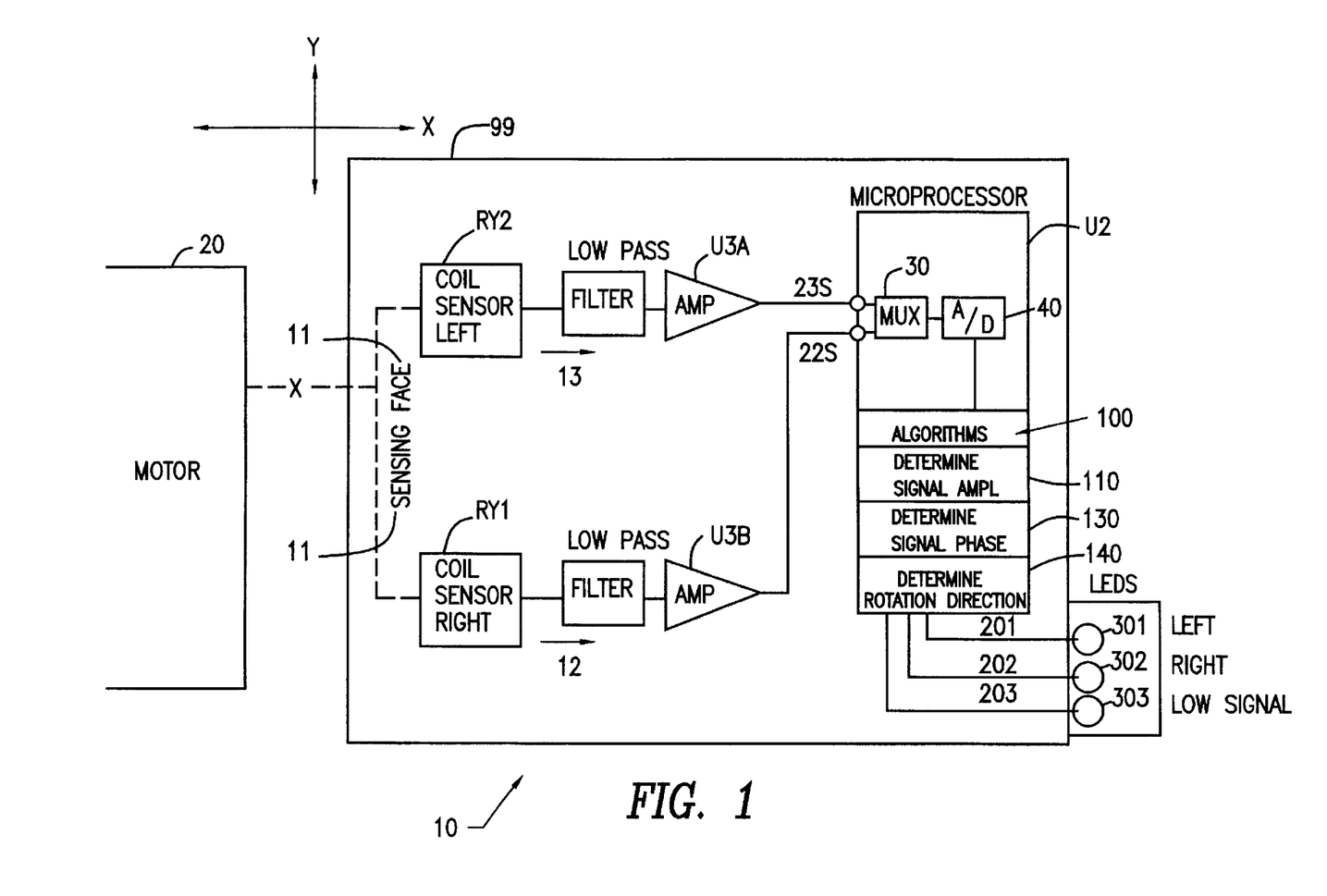
FIG. 1 illustrates a block diagram of the motor rotation detector apparatus according to the present invention.

Referring now to FIG. 1, there is shown an embodiment of the present invention motor rotation detector apparatus 10 for detecting the direction of rotation of the shaft of an electrical alternating current induction motor 20 without being in physical contact with the motor (or with electrical lead wires for connecting to the motor). Note that when referring to the drawings, like reference numerals are used to indicate like parts. FIG. 1 illustrates a schematic block diagram of the detector 10 comprising a pair of small sensing coils RY1 and RY2 used to sense the magnetic field flux output from motor 20. Each of the coil sensors RY1 and RY2 are separated from one another by a predetermined distance D which, in the preferred embodiment, is approximately 1–2 inches. In the preferred embodiment, coil sensor RY1 is defined to be the right coil sensor, while coil sensor RY2 represents the left coil sensor. The right coil sensor indicates a right directional rotation, while the left coil sensor will indicate a left directional rotation of the motor shaft. The basic concept is to detect a phase shift in the magnetic field sensed between each of the sensors separated by the predetermined physical distance in order to determine the particular rotation direction (i.e. left or right) of the running motor. The motor rotation detector is held against or near the side of an energized AC induction motor to determine the direction of rotation by rotating magnetic fields created by the interaction of the winding and the induced magnetic field in the rotor. The coil sensors operate to transduce the sensed magnetic field strengths into electrical signals at the outputs of RY1 and RY2 which are proportional to the sensed magnetic fields. Each of the coil sensors is coupled to a respective high gain amplifier U3A and U3B via respective low pass filters, so that the corresponding output signals 12 and 13 from the respective coil sensors RY1 and RY2 are input to the corresponding amplifier. Preferably, a 5 volt power supply (not shown) is resistively divided to 2.5 volts to bias both the amplifiers (U3A, U3B) and the coil sensors (RY2, RY1). Note that by having the amplifiers and the coils at the same potential, the high gain amplifiers can quickly come to equilibrium when power is turned on.

As shown in FIG. 1, the output signals 22s and 23s from each of the corresponding high gain amplifies are fed to analog input channels on the microprocessor unit U2. The signals input to the microprocessor are multiplexed by multiplexer 30 and converted into digital signals via analog to digital converter (A/D)40. The microprocessor U2 includes software algorithms 100* which execute various software programs resident within microprocessor program memory in order to ultimately determine the direction of shaft rotation. The software programs 100 are stored in memory in conventional fashion within the microprocessor, as is well known in the art. (Note however that it is contemplated that the programs may also be stored external to the microprocessor, such as in a database or the like.) The software functions within module 100 include software routine 110, which determines if the processed signals from each of the coil sensors RY1 and RY2 are of sufficient amplitude to perform the rotation detection processing.

Software module 110 also includes functionality which determines the phase of the motor based on the signal amplitudes so as to expedite processing determination of motor rotation. Software functionality module 130 operates to determine the relative phase angle between the signals by determining the zero crossing of one phase signal in relation to the other. Based on the relative signal amplitudes detected and based on the relative phase difference between the two signals, rotation logic software 140 within software module 100 determines the direction of motor rotation. (Note that if the signal amplitude as determined by the software is too low, an output signal 303 indicative of a low signal condition is output from the microprocessor to indicate that the motor rotation could not be determined because of the low signal level received by the coil sensors.

Upon determining the relative phase difference between the two sensed signals and determining which coil contains the leading signal, an output control signal is output from the microprocessor indicative of the determination of detection rotation. In the preferred embodiment, three LEDs labeled 301, 302, and 303, are electrically coupled to the microprocessor U2 and are used to indicate LEFT motor rotation, RIGHT motor rotation, and Low Signal conditions respectively. Preferably, control signals 201, 202, and 203 from processor U2 are coupled to each of the respective LEDs 301, 302, and 303, so as to illuminate the corresponding LED when the associated condition (left rotation, right rotation, or low signal condition) is detected.

Figure 2A:
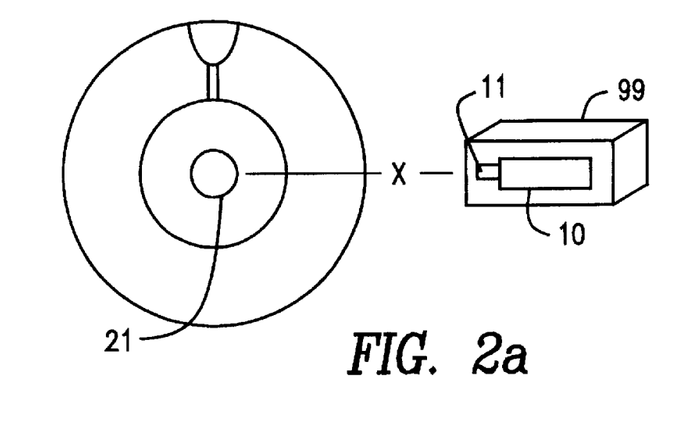
FIGS. 2A and 2B represent end views of a motor illustrative of the alignment and displacement positions of the magnetic rotation detector apparatus relative to the motor for determining proper rotation detection according to the present invention.
Figure 2B:
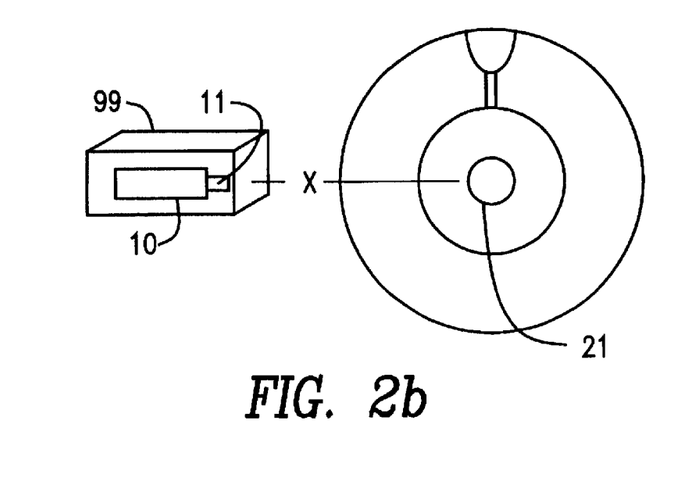

As shown in FIGS. 2A and 2B, the rotation detector 10 may be packaged by enclosing it within a housing 99 of plastic or other lightweight non-conducting (non-interfering) material, so as to form a compact, lightweight and portable device. The overall dimensions of the device is approximately 4 inches long by 2 inches wide, enabling it to be held within the palm of a user's hand.

Still referring to FIGS. 2A and 2B, in a preferred embodiment the apparatus 10 enclosed within housing 99 is positioned a distance X from the motor with sensing face 11 arranged perpendicular to the longitudinal axis of the motor shaft and at an angle of substantially 90 degrees in relation to the motor shaft. That is, the device is operated by holding the device perpendicular to the longitudinal axis of the motor. The axis of the sensing face is rotated 90 degrees from the motor's longitudinal axis. While the motor is running, a "push-to-test button" 77 (see FIG. 3) is pressed thereby providing power to the device. Rotational LEDs 301 and 302 are then illuminated to indicate that data is being sampled. Low signal LED 303 will illuminate if a strong enough signal is not detected. The detector should then be moved to another location on the motor if the low signal LED 303 illuminates. Once the data buffer is full, the directional LED that is not true will be extinguished, and the remaining LED that is illuminated will indicate the direction of rotation. A battery may be used to supply power to the device. Note that in the preferred embodiment, the distance X from which the apparatus is displaced from the motor, is approximately 1–2 inches. However, this distance may vary according to the strength of the magnetic field emitted from the motor. That is, for single phase motors it is probable that the distance X may be somewhat greater than for 3-phase motors, for example.

Figure 3:
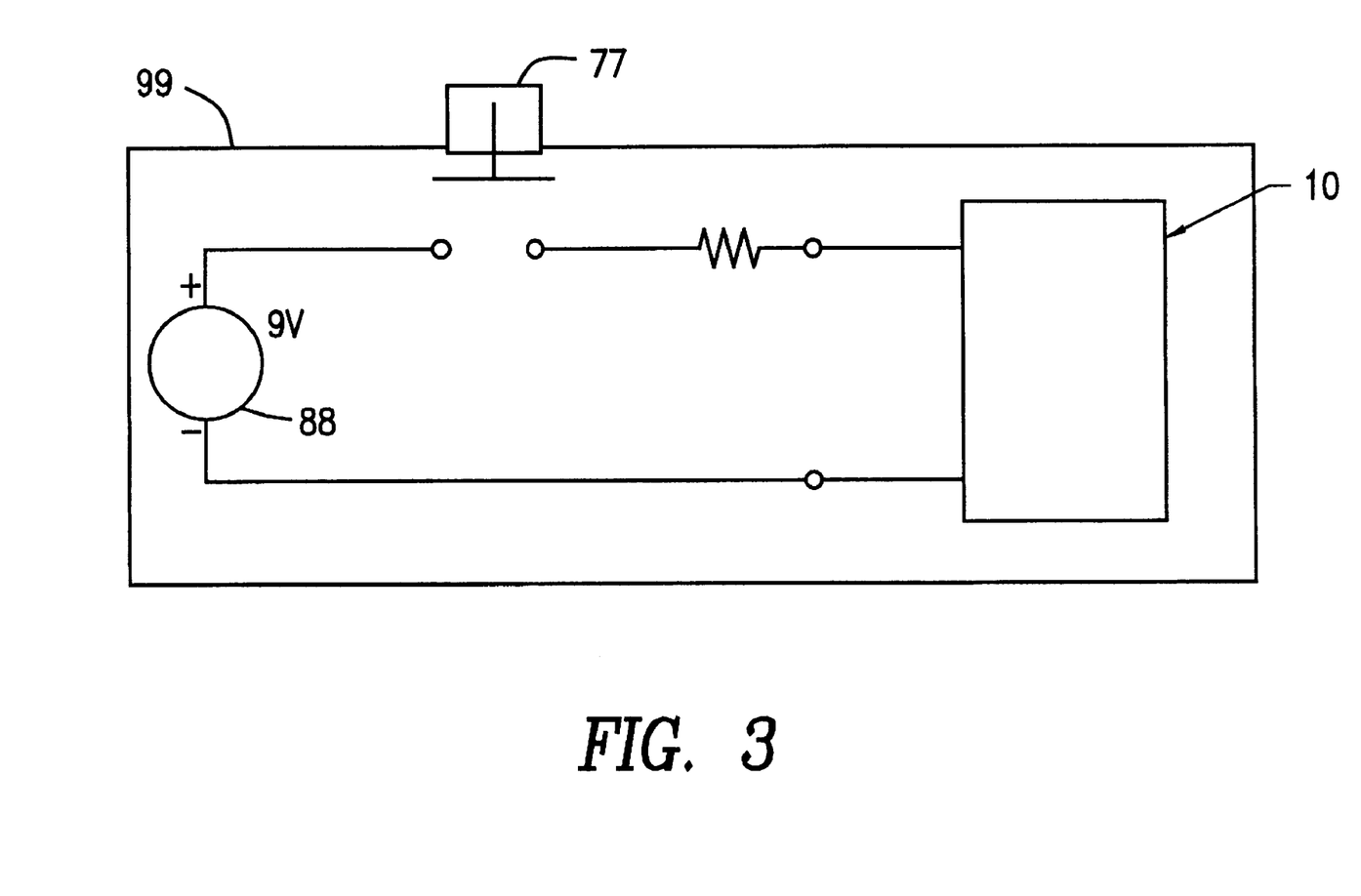
FIG. 3 shows a block diagram of an embodiment of the magnetic rotation detector apparatus enclosed within a housing and having a depressible switch for supplying power to the detector according to an aspect of the present invention.

As shown in FIG. 3, a switch or depressable button 77 disposed in housing 99 is in electrical communication with the detector 10, such that depression of the switch causes electrical communication with dry cell battery 88 for supplying power to and thus engaging the device.

Figure 4:
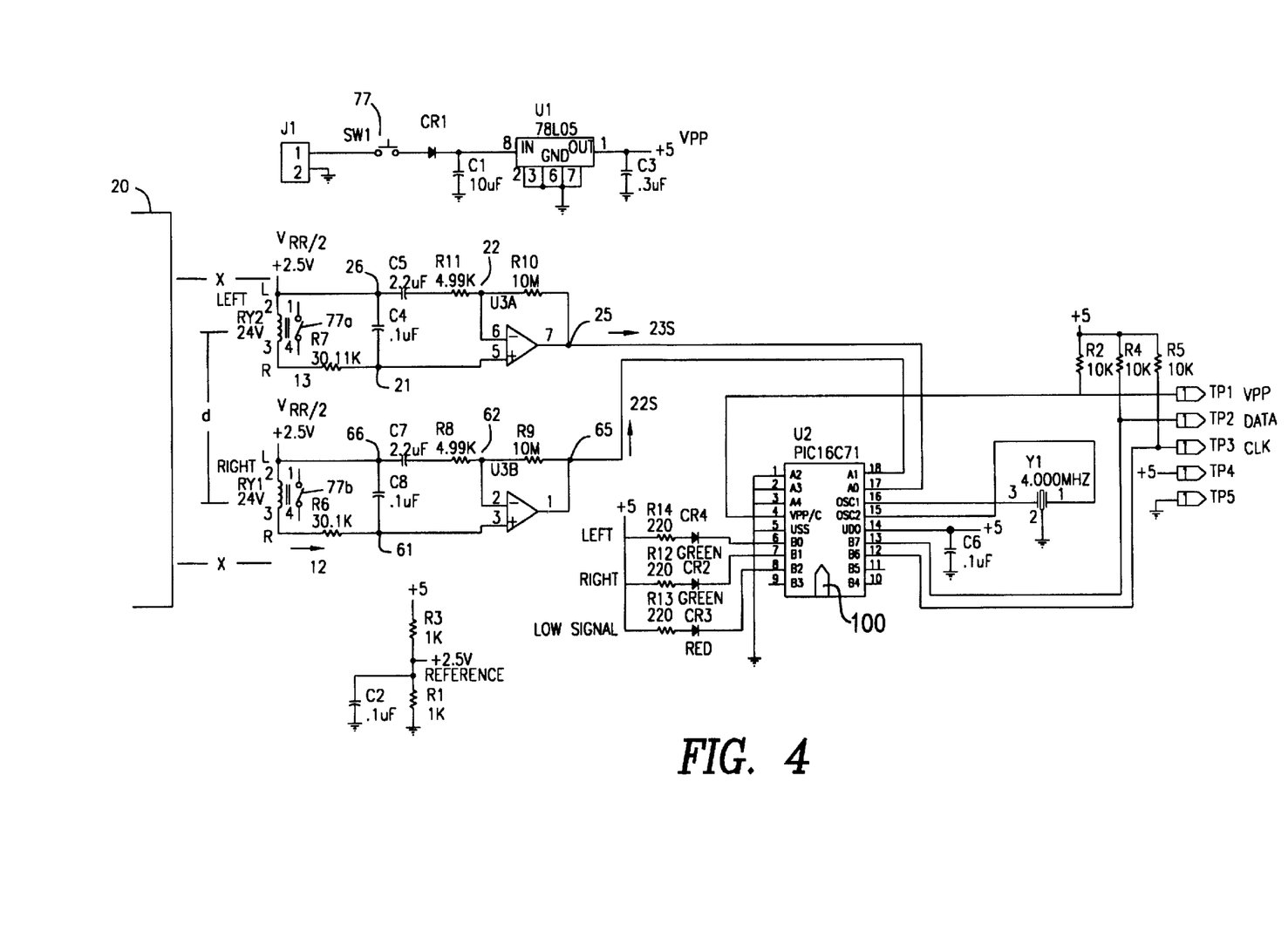
FIG. 4 represents a circuit schematic diagram of the magnetic rotation detector apparatus according to the present invention.

Referring now to FIG. 4, there is shown a schematic circuit diagram illustrating the electrical components associated with the motor rotation detector apparatus 10. The designations left and right represent the view of the top of the board from the motor end of the unit. Note that the circuit illustrated in FIG. 4 has been found to provide satisfactory operation using the numeric values indicated for each of the labeled components which are given only by way of example. When the apparatus 10 is properly positioned in relation to shaft 21 (see FIGS. 2A, 2B or 4A, 4B) of motor 20 and power is applied (via depression of switch 77 causing closure of switches 77A and 77B), left sensor RY2 senses a shifting magnetic field from rotary shaft 21 and converts it into a first signal 13. Right sensor RY1 aligned parallel to RY2 but separated a distance D from sensor RY2, operates to sense the shifting magnetic field from rotary shaft 21 and converts it into a second signal 12. Each sensor is spaced a distance D apart from one another, as measured from the centers of each sensor. Both sensors are separated from the motor by the same distance X. Thus, both sensors are in alignment along a first ("x") axis, but are displaced a distance D from one another along a second ("Y") axis. In the preferred embodiment, the sensors are separated by about 1 to 2 inches. Preferably, the sensors RY1 and RY2 are 24 volt reed relay coils (coils used only) having a large number of wire turns on each coil. The voltage induced into each coil from the magnetic field emanating from the motor shaft rotation will vary between microvolts to a few volts depending on the style of the motor. The output signal 13 from the left coil RY2 is filtered using a low pass filter formed from the combination of resistor R7 and capacitor C4 to remove the high frequency noise from the signal. In similar fashion, output signal 12 from the right coil RY1 is filtered via the resistor capacitor combination R6 and C8 to remove the high frequency noise.

More particularly, in the preferred embodiment illustrated in FIG. 4, the signal 13 output from sensor RY2 is input to operational amplifier U3A via a low pass filter structure. Capacitor C4 disposed between nodes 21 and 26 has its positive terminal coupled to Vpp/2 and its negative terminal coupled to resistor R7, so that the combination of C4 and R7 forms a low pass filter to remove high frequency noise within signal 13. Capacitor C5 is disposed between nodes 26 and 22, its negative terminal coupled to resistor R11 which in turn is coupled to input terminal 6 of amplifier U3A. Resistor R10 is arranged in a feedback configuration having terminal ends disposed between nodes 22 and 25. The combination of R10, C5, R11, and amplifier U3A forms a high frequency gain amplifier operative on signal 13. The combinational arrangement of resistor R10 and capacitor C5 permits signal 23s output from amplifier U3A to track the input signal having transition times matching the zero crossing of sensor signal 13.

In similar fashion, signal 12 output from sensor RY1 is input to operational amplifier U3B via a low pass filter. Capacitor C8 is disposed between nodes 61 and 66 with positive terminal coupled to Vpp/2 and negative terminal coupled to resistor R6, so that the combination of C8 and R6 forms a low pass filter to remove high frequency noise within signal 12. Capacitor C7 is disposed between nodes 66 and 62, with negative terminal coupled to resistor R8 which in turn is coupled to inverting terminal 2 of amplifier U3B. Resistor R9 is arranged in feedback configuration with terminal ends disposed between nodes 62 and 65. The combination of C7, R8, R9 and amplifier U3B forms a high frequency gain amplifier circuit operative on signal 12. The combinational arrangement permits signal 22s output from amplifier U3B to track the input signal with transition times matching the zero crossing of sensor signal 12. Signals 22s and 23s output from the preprocessor circuitry therefore represent signals corresponding to sensor signals 12 and 13 of varying amplitudes which are shifted in phase relative to one another.

As shown in FIG. 4, the output signals 22s and 23s output from respective amplifiers U3A and U3B are fed to analog input channels A1 and A0 of microprocessor U2. The signals feed to an 8-bit successive approximation analog to digital converter 40 via a multiplexer 30 (see FIG. 1) within the microprocessor. The microprocessor U2 is operated by a 4 MHZ ceramic resonator Y1. A 5 volt regulator U1 is used to provide a well regulated voltage to the processor, as well as to the amplifiers. As one can ascertain, the 5 volts is divided into 2.5 volts to offer a center biasing point. Single push button switch 77 (SW1) on the top cover of the housing 99 (see FIG. 3) is used to connect power to the regulator, and is to be depressed when a measurement is to be made. The power source is, in the preferred embodiment, a standard 9 volt alkaline battery (e.g. NEDA 1604A or equivalent) connected to battery connector J1. Battery reverse polarity is provided using blocking diode CR1. Port pin connections B0, B1, and B2 on microprocessor U2 are configured as digital output ports. These digital outputs are connected to and used to energize indicating light emitting diodes (LEDs) CR4, CR2, and CR3 which are coupled to respective resistors R14, R12, and R13. As shown in the circuit, the current to each of the LEDs is limited by the corresponding series dropping resistors. In the embodiment shown in FIG. 4, the light emitting diodes are defined as follows: "left rotation is associated with diode CR4, right rotation is associated with diode CR2 and a low signal condition is associated with diode CR3.

Software functionality 100 resident within the microprocessor U2 is utilized to analyze the signals input from each of the channels A0 and A1. The signals are analyzed for the following conditions:

a) to determine the number of phases powering the motor by analyzing the signal amplitude form each coil, b) to define the zero crossing point of the incoming signal from each coil, c) using the zero crossing point to confirm that the signal from each coil has the shape of a sine wave, d) determine the time shift between the sine waves of the left and right coils, e) based on the determined time shift, determine the sensor coil with the leading signal, f) determine valid data points based on the determined motor phase; and g) use software functionality to determine the consistency of the data prior to indicating the motor rotation.

Figure 6A:
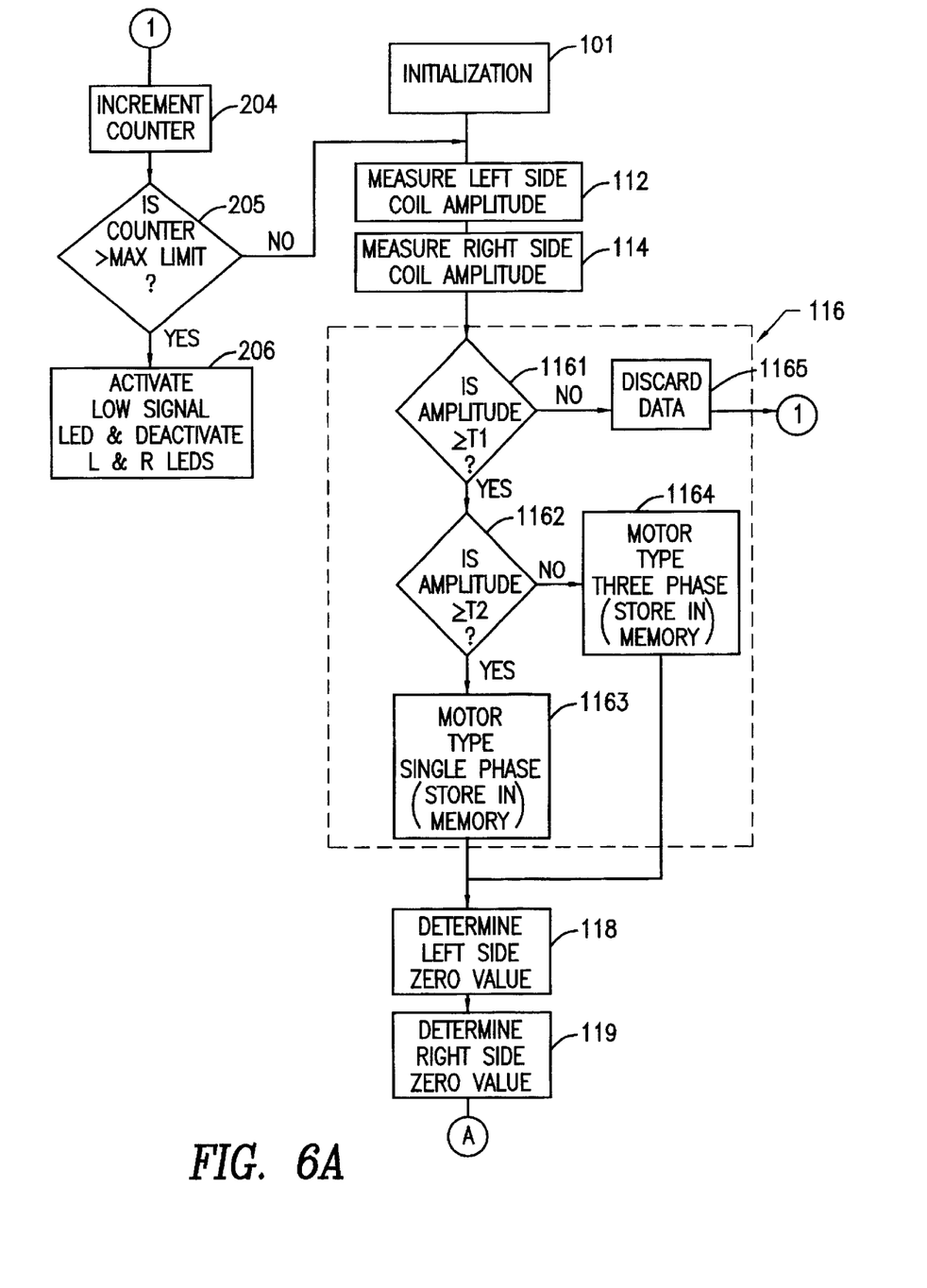
FIGS. 6A–D represent an exemplary illustration of a flow chart depicting the steps involved in processing the signals within the microprocessor for determining shaft rotation according to the present invention.

FIGS. 6A–D represent a flow chart depicting the processing steps involved in the software algorithm 100 for determining the motor rotation utilizing the sensed input signals. Referring now to FIG. 6A, when power is applied to the device initialization process 101 operates to perform initial setup and configuration, including register file and bit configuration, port definitions, and threshold data values including min/max signal values, maximum number of samples, flag settings and comparison threshold data among others. Amplitude determination software routine 110 within the microprocessor then operates on the sampled data output from the A/D converter by measuring the amplitude values associated with the left side coil sensor (RY2) and the right side coil sensor (RY1) to determine the peak-to-peak amplitude values. The amplitude data obtained from steps 112 and 114 are then used in step 116 to determine the type of motor (i.e. single phase or three phase motor). The amplitude data is compared to a predetermined threshold value T1 (module 1161) which is stored in memory. If the amplitude data does not meet the minimum threshold level, then the data is discarded (module 1165) and control is returned to the measurement of amplitude data in steps 112 and 114. If the amplitude data exceeds the threshold value T1, the data is then compared with a second threshold value T2 (module 1162). If the data exceeds the second threshold value T2, then the amplitude data represents a strong magnetic field (strong B field) indicative of a single phase motor type (module 1163). If the amplitude data exceeds the first threshold, but is less than the second threshold value, then the amplitude data indicates that the motor type is a three phase motor (module 1164). Upon determination of the motor type, processing proceeds by calculating the left side zero value of the signal waveform amplitude data (step 118) and the right side zero value (step 119).

Figure 6B:
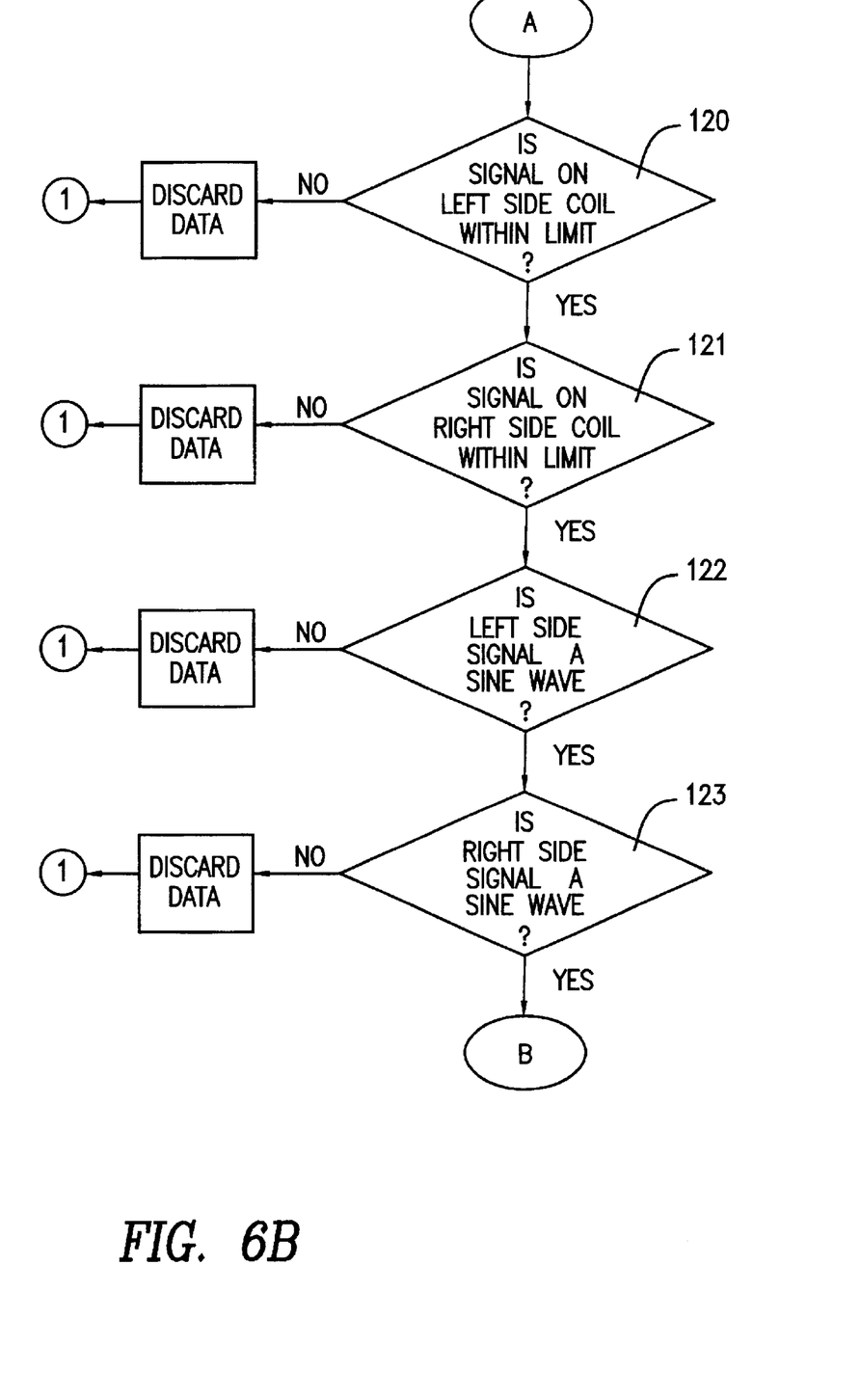
Figure 6C:
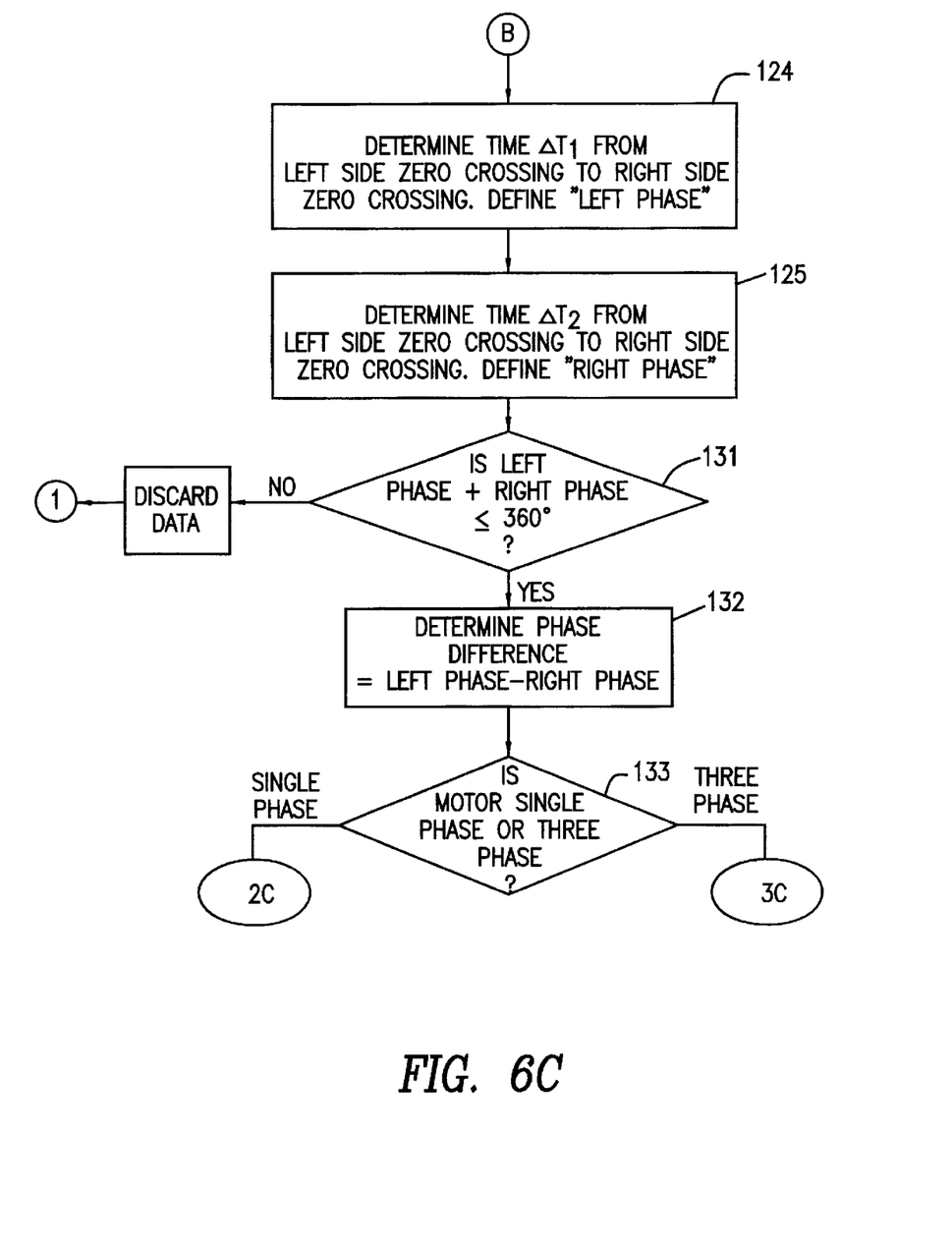
Figure 7:
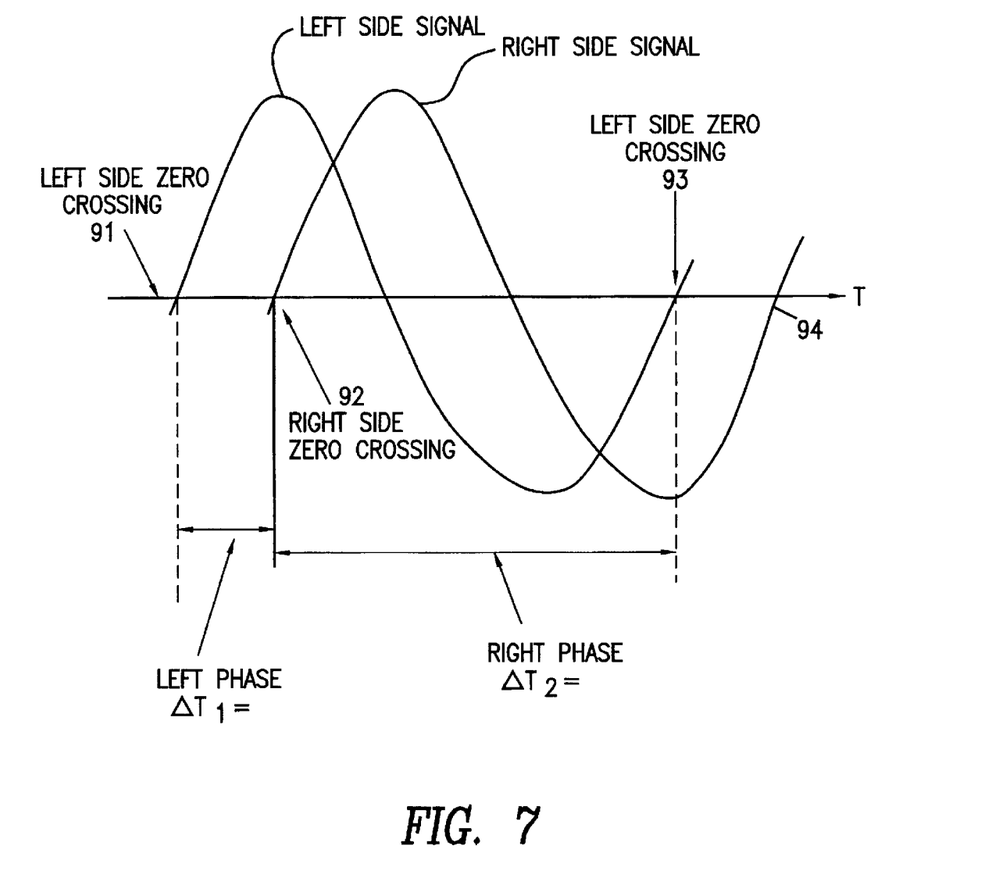
FIG. 7 is an exemplary illustration of left and right side magnetic field signals detected by the sensors and used to determine phase and zero crossing information according to the present invention.

FIG. 7 provides an exemplary illustration of determination of the left side zero crossing values 91, 93 right side zero crossing values 92, 94 and the determination of left phase $\Delta T1$ and right phase $\Delta T2$ values associated with amplitude data from each of the input signals from the corresponding left and right coil sensors respectively. Processing proceeds in step 120 and 121 where further determination of the appropriateness of the left and right signals is made by comparing it with threshold data associated with the determined motor type. This is illustrated in FIG. 6B. If the data is not within the predetermined values associated with good or acceptable data, then the data is discarded and processing returns to step 112 for measuring additional input data. Steps 122 and 123 operate to confirm the shape of the signal supplied from each of the left and right sensor coils meet the requirements of a sine wave prior to proceeding with determination of the direction of rotation. This is determined using the left side and right side zero values calculated in steps 118 and 119. If the sample values associated with the signal waveform correspond to a sine wave signal, then processing proceeds to step 124 (FIG. 6C) where the time difference $\Delta T1$ from the left side zero crossing 91 to the right side zero crossing 92 is determined. Similarly, step 125 calculates the time $\Delta T2$ from the right side zero crossing 92 to the left side zero crossing 93. This information is illustrated in FIG. 7. The time interval $\Delta T1$ is defined to be associated with the left phase, while the time interval $\Delta T2$ defines the right phase.

Figure 6D:
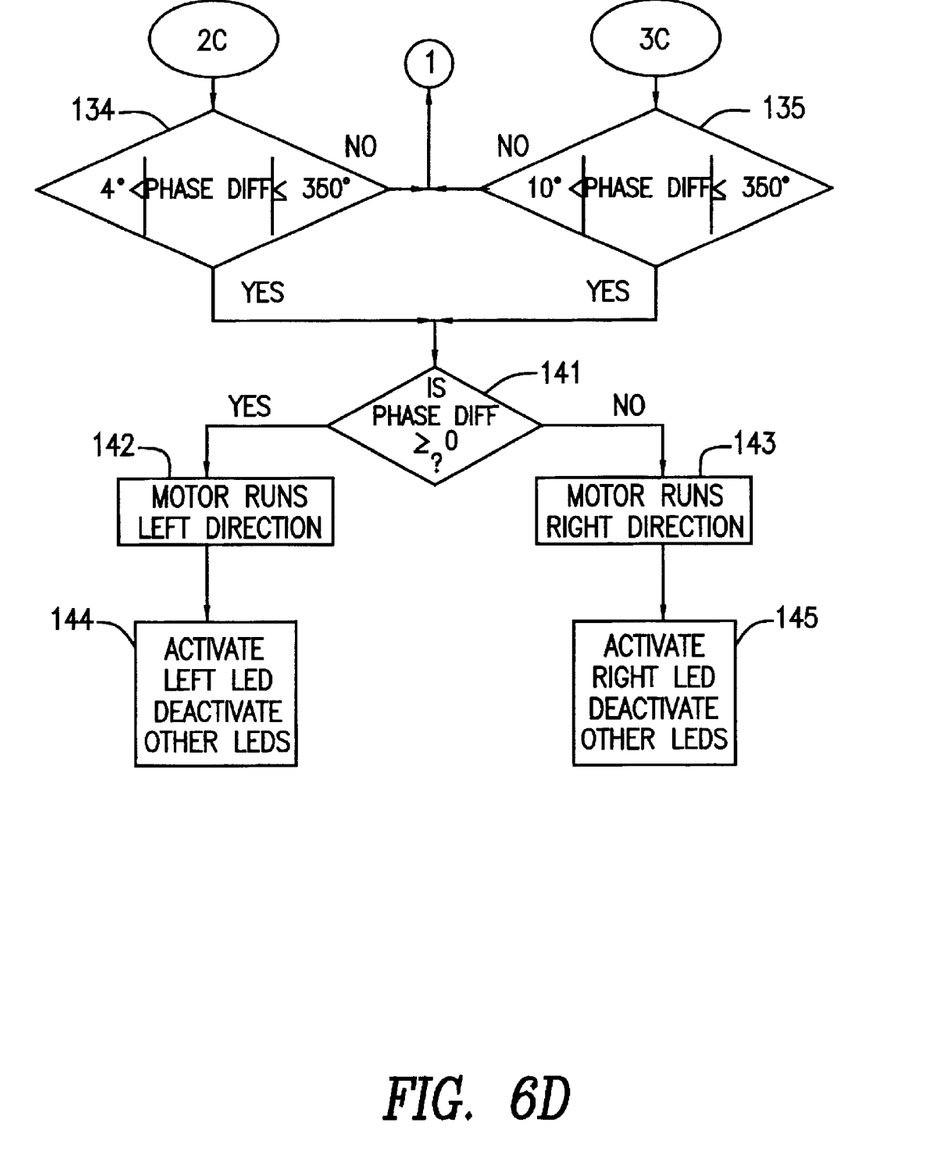

These values are stored in memory and phase determination software routine 130 accumulates the left and right phase values and determines if the sum is less than or equal to 360 degrees (module 131). If the accumulated left and right phase are less or equal to 360 degrees, then the phase difference is determined by subtracting the right phase value $\Delta T2$ from the left phase value $\Delta T1$ (module 132). Otherwise, processing returns to measuring new amplitude data from the left and right coils. As illustrated in module 133, the software uses the number of phases detected in step 116 in order to increase detection accuracy and reduce detection time. This is illustrated by the processing steps 134 and 135 where different thresholds are utilized for comparing with the magnitude of the determined phase difference (from step 132) based on the determined motor phase. This is because large motors (i.e. three phase motors) are usually much more magnetically efficient and thereby produce small signals which do not saturate the amplifiers, and thus produce a smaller phase angle. In this case, a minimum of 10 degrees of phase difference must occur for detection of a valid signal (step 135). For small single phase motors, the magnetic field typically leaks out of the frame to produce a larger magnetic field. This signal saturates the amplifiers, thereby producing square waves. As shown in step 134, the threshold value is used with a minimum of 4 degrees of phase shift to derive a valid signal. Approximately 50 valid readings are taken and are averaged together over a period of about 2 seconds. In the preferred embodiment, the logic works by simple majority voting. If the phase difference falls within the appropriate threshold as indicated in steps 134 and 135, then processing proceeds to module 141 for determining the direction of motor rotation. This is determined by analyzing the phase shift difference associated with each of the corresponding left and right signal waveforms. If the phase shift difference is greater than or equal to zero, then the determination is made that the motor operates in a left direction (step 142). If the phase shift difference is less than zero, then the motor runs in a right direction (step 143). Depending on the determination, the control signal is then activated to turn on the appropriate left LED (module 144) or right LED (module 145) to indicate the direction of motor rotation. Note that as shown in step 116, if the amplitude data is sufficiently small, then the data is discarded and a counter is incremented (module 204). The counter is then compared with a maximum threshold, as shown in unit 205. If the counter is less than the maximum limit, then new data is obtained from the buffer and new left and right side coil amplitude measurements are obtained. If however, the maximum limit has been exceeded, then the software operates to generate a control signal to activate the low signal LED indicating that proper motor rotation detection could not be made.

Figure 5A:
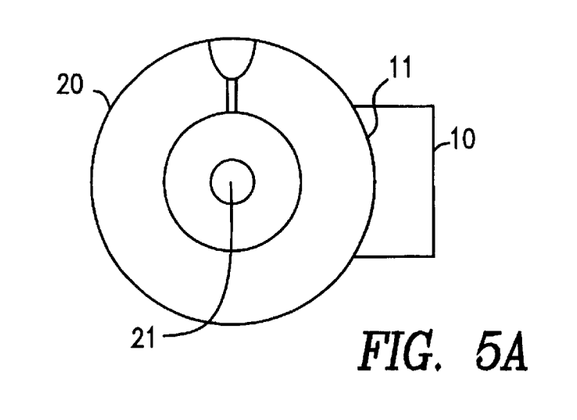
FIGS. 5A and 5B are end views of a motor and shaft illustrating the alignment position of the magnetic rotation detector apparatus fixedly coupled to the side of the motor according to another aspect of the present invention.
Figure 5B:
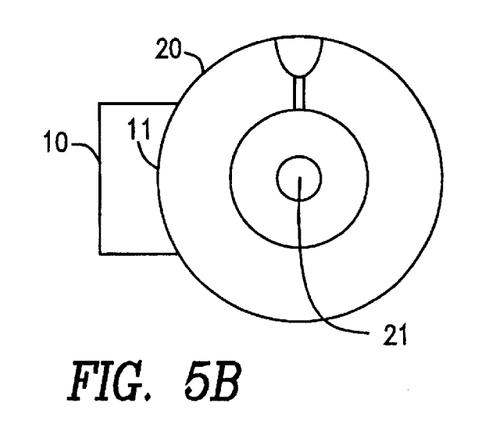

As illustrated in FIGS. 5A and 5B, the inventive apparatus 10 may also be mounted to the side of a motor 20 for constant verification of rotation and direction of rotation of motor shaft 21. This may be advantageous in critical processes such as nuclear power plants, where immediate knowledge of shaft rotation may be required. In accordance with a preferred embodiment, apparatus 10 would be mounted at an estimated mid-point of motor 20 away from heavy bases or pedestals, using bolts or other fixed connectors so as to resist vibration and properly secure the device.

In this manner, permanently mounting the unit onto a side of a motor enables a constant verification of the rotation and direction of the rotation. The depressable switch 77, in this case may then be eliminated to provide a constant energizing signal, or may simply be in a constantly enabled position (rather than the disabled or non-connected position illustrated in FIG. 4) to provide constant power to the detector device.

As will be appreciated from the foregoing discussion, the present invention provides a practical mechanism for determining the direction of rotation of an AC induction motor without requiring physical contact with the motor or motor housing itself, and without providing electrical interconnection via wires or leads to the motor. As has also been described, the present invention provides a detector device which determines the number of electrical phases that are supplying power to the motor without disrupting the electrical connections at the input power to the motor, as well as confirming that the shape of the output signal supplied from each of the coils meets the requirements of the sine wave prior to proceeding with the determination of direction rotation. Finally, it has been shown that the apparatus determines the time shift between the sine waves supplied by the coils in order to determine which coil has the leading signal which in turn determines motor rotation.

It will be understood that a person skilled in the art may make many variations and modifications to the described embodiments utilizing functionally equivalent elements to those described. Any variations and modifications to those described herein above, are intended to be included within the scope of the invention as defined by the appended claims.

What is claimed is:

1. A leadless motor rotation detector apparatus for determining the direction of shaft rotation of a motor providing a fluctuating magnetic field when rotating, said apparatus comprising:

at least two sensors separated a predetermined distance D1 from one another, each said sensor operative for sensing said magnetic field and generating a corresponding sensor signal having an amplitude and phase associated with said sensed magnetic field; and a processor responsive to said sensor signals for comparing temporal aspects associated with the relative phase of each of said sensor signals to determine a leading or lagging signal, said leading or lagging signal associated with a corresponding one of said at least two sensors and indicative of the direction of motor rotation, wherein said sensor signals are substantially sinusoidal waveforms and wherein said processor includes;

means for determining zero crossing points associated with each of said sensor signals;

means for determining first and second time differences associated with said zero crossing points, wherein said first time difference is associated with the time interval between the first zero crossings of said sensor signals and wherein said second time difference is associated with a first zero crossing of one of said sensor signals and a second zero crossing of the other sensor signal.

2. A leadless motor rotation detector apparatus for determining the direction of shaft rotation of a motor providing a fluctuating magnetic field when rotating, said apparatus comprising:

at least two sensors separated a predetermined distance D1 from one another, each said sensor operative for sensing said magnetic field and generating a corresponding sensor signal having an amplitude and phase associated with said sensed magnetic field; and a processor responsive to said sensor signals for comparing temporal aspects associated with the relative phase of each of said sensor signals to determine a leading or lagging signal, said leading or lagging signal associated with a corresponding one of said at least two sensors and indicative of the direction of motor rotation, wherein said processor comprises:

means for determining the number of phases powering said motor by analyzing the signal amplitudes of said signals output from the corresponding sensors;

means for determining a zero crossing point associated with each said sensor signal to determine the waveform shape of the signals;

means for comparing said signal waveform shapes with a predetermined waveform shape to determine the validity of data values constituting said signal waveform shapes.

3. A compact, portable motor rotation detector apparatus for determining the direction of shaft rotation of a motor providing a fluctuating magnetic field when rotating, said apparatus comprising:

left and right sensors displaced a predetermined distance D1 from one another for detecting said fluctuating magnetic field and producing corresponding left and right sensor signal waveforms; each having an amplitude and phase corresponding to the sensed fluctuating magnetic field from each of the corresponding left and right sensors;

amplifier circuitry for amplifying said respective left and right sensor signal waveforms;

a processor having first and second input channels for receiving said corresponding amplified left and right sensor signal waveforms, wherein said processor includes means for detecting a phase shift between said left and right signal waveforms by examining the zero crossings of one of said sensor signals in relation to the other for determining a leading signal associated with a corresponding one of said left and right sensors; and means for providing a control signal indicative of the direction of motor rotation based on the determination of which one of said left and right sensors is associated with said leading signal.

4. The apparatus according to claim 3, wherein said processor further comprises:

means for determining the number of phases powering said motor by analyzing signal amplitudes of said sensor signal waveforms output from the corresponding left and right sensors; and means for comparing said signal waveform shapes based on said zero crossing points with a sinusoidal waveform to determine the validity of data values constituting said signal waveforms associated with said corresponding sensors.

5. The apparatus according to claim 4, wherein said apparatus is encased in a non-metallic housing.

6. The apparatus according to claim 3, wherein said apparatus is not in contact engagement with said motor during detection of said magnetic field.

7. In a leadless detector having left and right sensors for sensing magnetic field intensity, a method for determining the direction of shaft rotation of a motor providing a fluctuating magnetic field when rotating, said method comprising the steps of:

generating left and right sensor signals from said corresponding left and right sensors separated a predetermined distance from one another, each of said left and right sensor signals having an amplitude and phase associated with said sensed magnetic field;

detecting a phase shift between said left and right sensor signals by examining zero crossing points of one of said sensor signals in relation to the other and determining a leading signal associated with a corresponding one of said left and right sensors based on said phase shift, whereby said corresponding sensor is indicative of the direction of motor rotation.

8. The method according to claim 7, further comprising the step of determining the amplitudes of said left and right sensor signals and comparing with threshold values to determine the number of phases associated with said motor.

9. The method according to claim 8, wherein the step of detecting the phase shift between said left and right sensor signals further comprises:

determining a left phase value associated with said signal from said left sensor by measuring the time between the first zero crossing of said left sensor signal to the first zero crossing of said right sensor signal;

determining a right phase value associated with said signal from said right sensor by measuring the time between the first zero crossing of said right sensor signal to the second zero crossing of said left sensor signal; and determining said phase shift as the difference between said left phase value and said right phase value.

10. The method according to claim 9, further comprising the step of comparing said determined phase shift with a predetermined threshold value based on the determined phase of said motor in order to determine the validity of the data for detecting said direction of motor rotation.

11. A leadless motor rotation detector for determining the direction of shaft rotation of a motor providing a fluctuating magnetic field when rotating, said detector comprising:

at least two sensors separated a given distance from one another, each said sensor operative for sensing said magnetic field and generating a corresponding sensor signal having an amplitude and phase associated with said sensed magnetic field; and a processor responsive to said sensor signals for comparing temporal aspects associated with the relative phase of each of said sensor signals to determine a leading or lagging signal by determining reference points associated with each of said sensor signals, said leading or lagging signal associated with a corresponding one of said at least two sensors and indicative of the direction of motor rotation, wherein said reference points are zero crossing points.

\* \* \* \* \*